United States Patent
Kageyama

(10) Patent No.: US 8,640,750 B2
(45) Date of Patent: Feb. 4, 2014

(54) PNEUMATIC TIRE WITH TREAD HAVING SHOULDER BLOCKS AND CROWN BLOCKS

(75) Inventor: Naoki Kageyama, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 785 days.

(21) Appl. No.: 12/723,399

(22) Filed: Mar. 12, 2010

(65) Prior Publication Data

US 2011/0041972 A1    Feb. 24, 2011

(30) Foreign Application Priority Data

Aug. 24, 2009 (JP) ................................. 2009-193374

(51) Int. Cl.
*B60C 11/11* (2006.01)
*B60C 11/12* (2006.01)

(52) U.S. Cl.
USPC ............ 152/209.15; 152/209.18; 152/209.27; 152/209.28; 152/902; 152/DIG. 3

(58) Field of Classification Search
USPC ............... 152/209.2, 209.15, 209.18, 209.27, 152/209.28, 902, DIG. 3
See application file for complete search history.

(56) References Cited

U.S. PATENT DOCUMENTS

| 5,526,860 | A | * | 6/1996 | Minami .................... 152/209.27 |
| 6,923,231 | B2 | * | 8/2005 | Cantu' et al. ............. 152/209.18 |
| 2005/0006015 | A1 | * | 1/2005 | Richards et al. ........... 152/209.2 |

FOREIGN PATENT DOCUMENTS

| EP | 0729854 | A2 | | 9/1996 |
| EP | 0846578 | A2 | | 6/1998 |
| JP | 63-078805 | A | * | 4/1988 |
| JP | 63-312204 | A | * | 12/1988 |
| JP | 03-007606 | A | * | 1/1991 |
| JP | 04-133805 | A | * | 5/1992 |
| JP | 05-254311 | A | * | 10/1993 |
| JP | 8-290707 | A | | 11/1996 |
| JP | 2879683 | B2 | * | 4/1999 |
| JP | 2005-297880 | A | | 10/2005 |
| JP | 2006-082659 | A | * | 3/2006 |
| JP | 2007-176282 | A | * | 7/2007 |

OTHER PUBLICATIONS

Machine translation for Japan 2,879,683 (no date).*
Machine translation for Japan 2007-176282 (no date).*
Machine translation for Japan 2006-082659 (no date).*
Machine translation for Japan 05-254311 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire comprises: an axially inner circumferential row of crown blocks disposed on each side of the tire equator; and an axially outermost circumferential row of shoulder blocks disposed axially outside thereof. The crown blocks are circumferentially divided by alternate first and second crown axial grooves. The shoulder blocks are circumferentially divided by alternate first and second shoulder axial grooves. The first shoulder axial groove has a groove width of not less than 3.5 mm. The first crown axial groove has a groove width of not less than 2.0 mm. The second shoulder axial groove comprises an axially innermost sipe-like part having a groove width of 0.5 to 2.0 mm, and an axially outer main part having a groove width of not less than 3.5 mm. The second crown axial groove comprises an axially innermost sipe-like part having a groove width of 0.5 to 2.0 mm, and an axially outer main part having a groove width of not less than 2.0 mm.

14 Claims, 5 Drawing Sheets

US 8,640,750 B2

PNEUMATIC TIRE WITH TREAD HAVING SHOULDER BLOCKS AND CROWN BLOCKS

BACKGROUND OF THE INVENTION

The present invention relates to a pneumatic tire, more particularly to a tread pattern suitable for studless tires comprising four circumferential rows of tread blocks capable of improving the noise performance.

In general, a studless tire is provided in the tread portion with a large number of sipes to improve running performance on icy roads. Further, the tread portion is provided with tread grooves (axial grooves and circumferential grooves). Such tread grooves are formed relatively wide in comparison with those of summer tires in order that when running on a snowy road a relatively large volume of snow can be packed into the tread grooves existing in the ground contacting patch because a relatively large volume of packed snow in the tread grooves provides a relatively large shearing force (herein after "in-groove snow shearing force"), therefore, road grip performance (braking force, traction force) on snowy roads is improved.

In recent years, on the other hand, with improvements in the tread rubber compounds of studless tires, there are increasing opportunities for the studless tires to run on dry asphalt roads. As a result, the studless tires are also required to reduce their noise emission equally to summer tires.

In the case of studless tires, the tread portion is relatively soft due to the tread compound and a large number of sipes, as a result, it is more effectual for reducing the noise emission to reduce the sound pressure level of so called air resonance noise. The air resonance noise is a noise sound caused by resonance of air in a tube like part formed between a wide straight circumferential groove in the ground contacting patch and the road surface.

If the width of the circumferential groove is decreased, the air resonance therein can be suppressed, but deterioration of on-the-snow running performance and wet performance is inevitable.

SUMMARY OF THE INVENTION

It is therefore, an object of the present invention to provide a pneumatic tire, in which noise performance can be improved without sacrificing the on-the-snow running performance.

According to the present invention, a pneumatic tire comprises a tread portion provided with at least four circumferential rows of blocks including: an axially inner circumferential row of crown blocks disposed on each side of the tire equator; and an axially outermost circumferential row of shoulder blocks disposed axially outside the axially inner circumferential row, wherein the crown blocks are circumferentially divided by first crown axial grooves and second crown axial grooves which are alternately arranged in the tire circumferential direction, and the shoulder blocks are circumferentially divided by first shoulder axial grooves and second shoulder axial grooves which are alternately arranged in the tire circumferential direction, wherein each of the first shoulder axial grooves has a groove width of not less than 3.5 mm along the entire length thereof, each of the second shoulder axial grooves comprises an axially innermost sipe-like part having a groove width of from 0.5 to 2.0 mm, and an axially outer main part having a groove width of not less than 3.5 mm, each of the first crown axial grooves has a groove width of not less than 2.0 mm along the entire length thereof, and each of the second crown axial grooves comprises an axially innermost sipe-like part having a groove width of from 0.5 to 2.0 mm, and an axially outer main part having a groove width of not less than 2.0 mm which is more than that of the sipe-like part.

In this application, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

A normally inflated loaded condition is such that the tire is mounted on the standard wheel rim and inflate to the standard pressure and loaded with the standard tire load.

The standard wheel rim is a wheel rim officially approved for the tire by standard organization, i.e. JATMA (Japan and Asia), T&RA (North America), ETRTO (Europe), STRO (Scandinavia) and the like.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

In case of passenger car tires, however, the standard pressure and standard tire load are uniformly defined by 180 kPa and 88% of the maximum tire load, respectively.

The term "groove width" means a width measured at the top of the groove in a direction perpendicular to the widthwise center line of the groove.

The tread width TW is the axial distance between the tread edges Te measured in the normally inflated unloaded condition of the tire.

The tread edges Te are the axial outermost edges of the ground contacting patch (camber angle=0) in a normally inflated loaded condition.

DESCRIPTION OF THE PREFERRED EMBODIMENTS

An embodiment of the present invention will now be described in detail in conjunction with accompanying drawings.

According to the present invention, pneumatic tire comprises a tread portion 2, a pair of axially spaced bead portions, a pair of sidewall portions, a carcass extending between the bead portions through the tread portion 2 and sidewall portions, and a tread reinforcing belt disposed radially outside the carcass in the tread portion 2 as usual.

The pneumatic tire in this embodiment is a studless tire for passenger cars.

Figure 1:
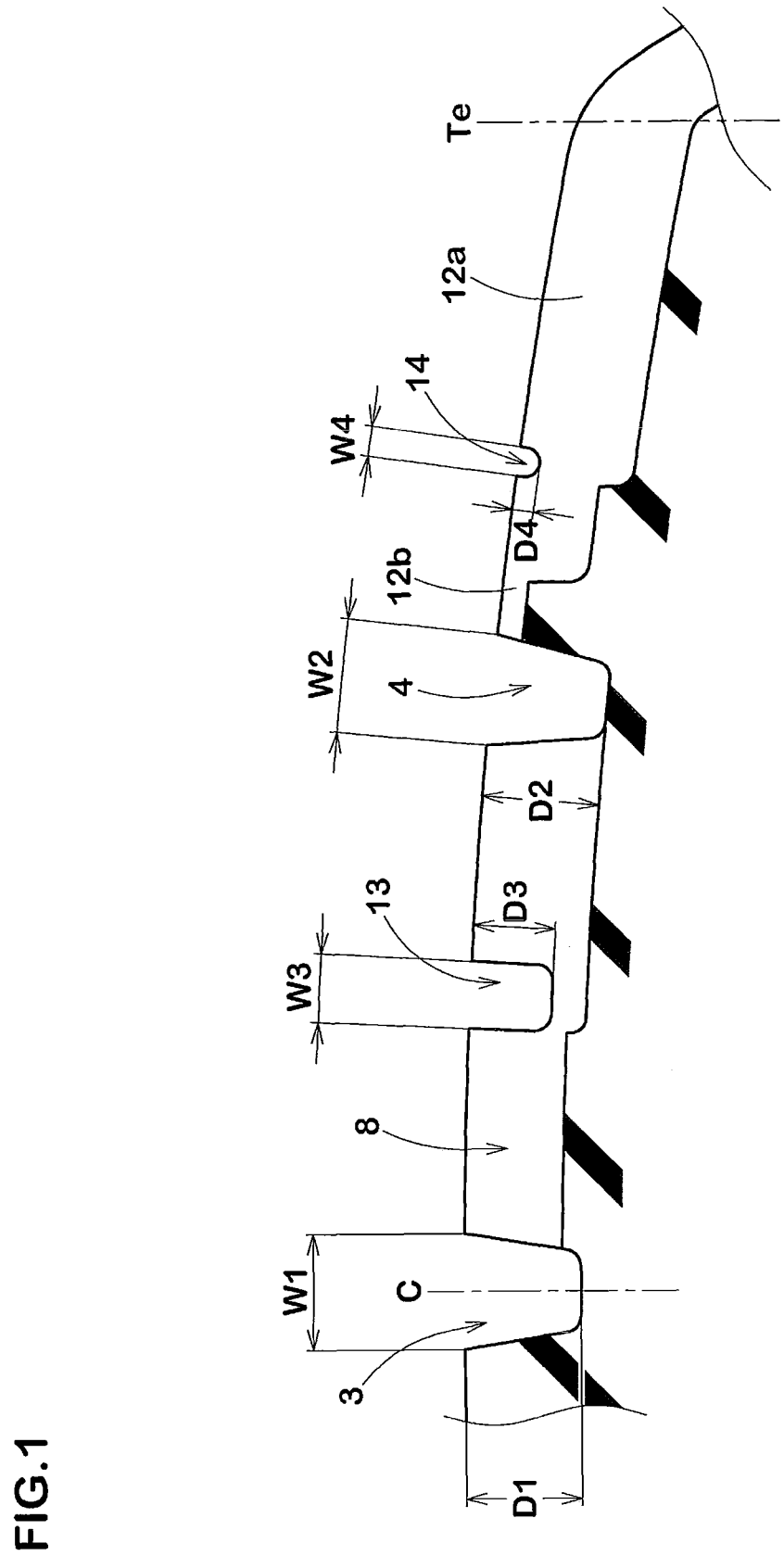
FIG. 1 is a cross sectional view of a tread portion of a studless tire according to the present invention taken along line x-x of FIG. 2.
Figure 2:
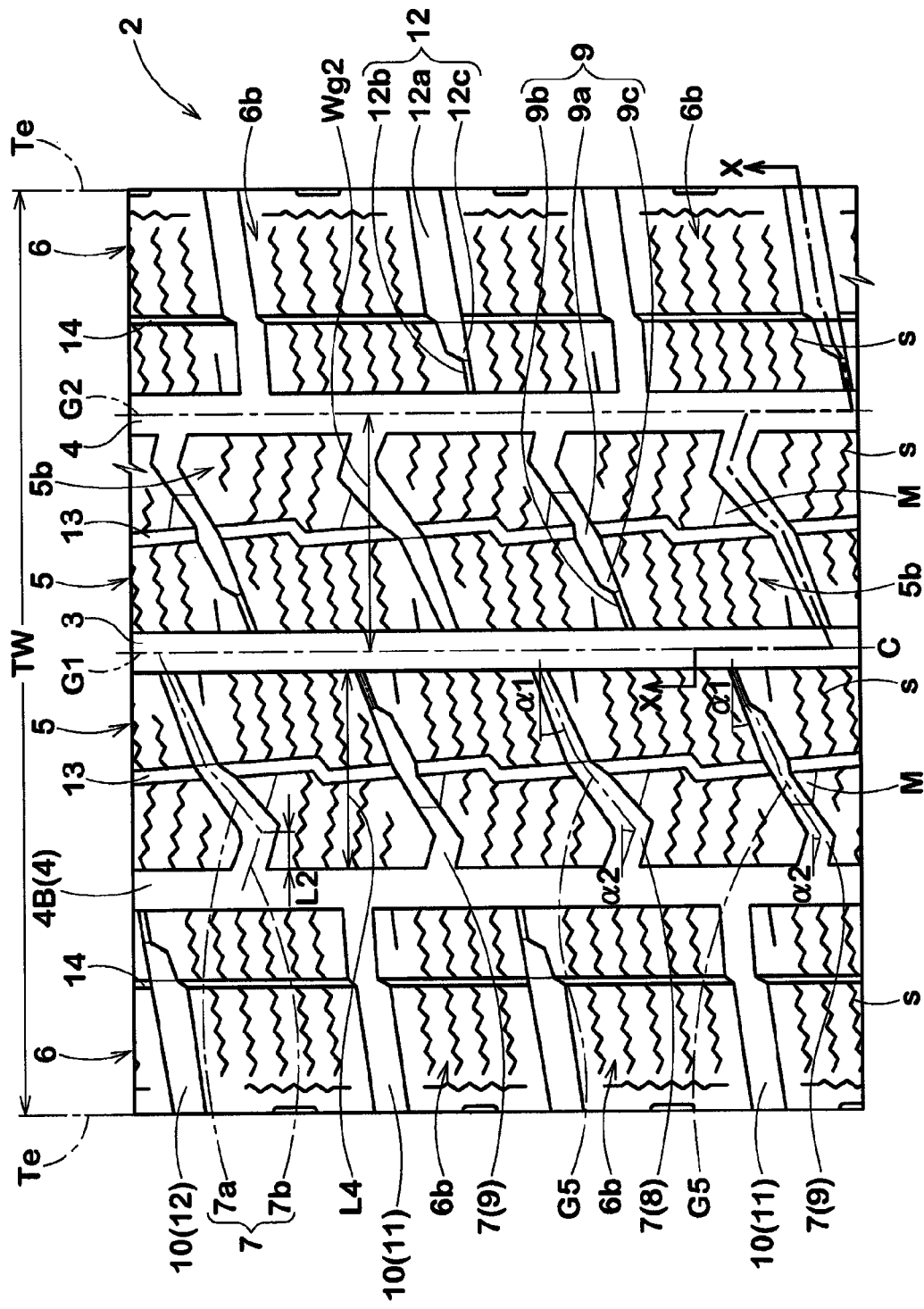
FIG. 2 is a developed view of a part of the tread portion.

As shown in FIG. 1 and FIG. 2, the tread portion 2 is provided with at least three circumferentially-continuously-extending wide straight main grooves which include a pair of axially outermost shoulder main grooves 4 and at least one crown main groove 3 between the shoulder main grooves 4. In this embodiment, at least one crown main groove 3 is only one crown main groove 3 disposed on the tire equator C.

A resultant annular shoulder portion 6, which is formed between each of the shoulder main grooves 4 and the adjacent tread edge Te, is provided with shoulder axial grooves 10 extending across the entire width of the annular shoulder portion 6 so as to circumferentially divide the annular shoulder portion 6 into a plurality of shoulder blocks 6b in a circumferential row.

A resultant annular crown portion 5, which is formed between each of the shoulder main grooves 4 and the axially inwardly adjacent crown main groove 3, is provided with crown axial grooves 7 extending across the entire width of the annular crown portion 5 to circumferentially divide the annular crown portion 5 into a plurality of crown blocks 5b in a circumferential row.

The blocks 5b and 6b are each provided with a plurality of zigzag sipes (s).

In order that snow packed into the main grooves 3 and 4 is easily self-ejected therefrom during running and at the same time the annular portions 5 and 6 can maintain their respective rigidity, the axial width W1 of the crown main grooves 3 and the axial width W2 of the shoulder main grooves 4 are preferably set in a range of from 3.0 to 8.0% of the tread width TW.

In this embodiment, each of the main grooves 3 and 4 is a straight groove having a constant cross-sectional shape along the length thereof. However, a smoothly curved wavy configuration, a rectilinear zigzag configuration and the like alone or in a combination may be employed.

In the case of a studless tire for passenger cars, it is preferable that the crown main grooves 3 have a depth D1 in a range of from 8.0 to 10.0 mm and the shoulder main grooves 4 have a depth D2 in a range of from 8.0 to 10.0 mm. In this particular example, the groove depths D1 and D2 are 9.1 mm.

In the case that only one crown main groove is provided in the tread portion as in this embodiment, it is preferable that: the center line G1 of the crown main groove 3 is positioned at the tire equator C; and the center line G2 of each of the shoulder main grooves 4 is disposed at an axial distance Wg2 from the tire equator C, which distance Wg2 is preferably not less than 20%, more preferably not less than 23%, but not more than 30%, more preferably not more than 28% of the tread width TW.

By setting in this way, a rigidity balance between the annular crown portion 5 and annular shoulder portions 6 is improved, and the steering stability can be improved.

Figure 3:
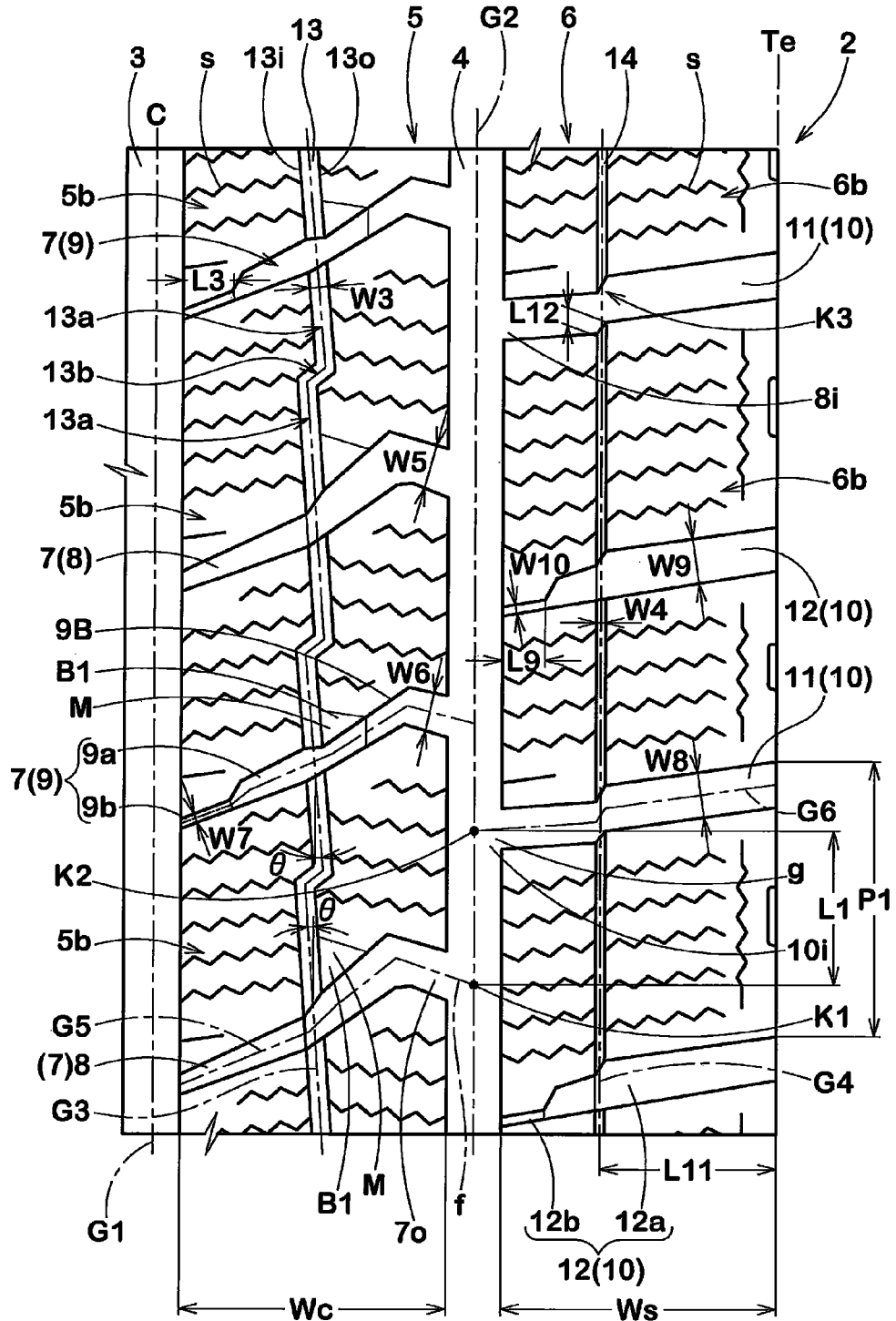
FIG. 3 is an enlarged developed view of a right half of the tread portion shown in FIG. 1.

The above-mentioned shoulder axial grooves 10 in each block row are, as shown in FIG. 2 and FIG. 3, first shoulder axial grooves 11 and second shoulder axial grooves 12 which are alternately arranged in the tire circumferential direction.

The first shoulder axial groove 11 is defined as having a groove width W8 in a range of from 3.5 to 10.0 mm along the entire length thereof.

The second shoulder axial groove 12 is formed by a main part 12a having a groove width W9 in a range of from 3.5 to 10.0 mm,
a very narrow sipe-like part 12b having a substantially constant groove width W10 of from 0.5 to 2.0 mm and extending axially inwardly from the main part 12a to open towards the shoulder main groove 4, and
a transitional part 12c connecting between the main part 12a and sipe-like part 12b and having a groove width gradually decreasing from the main part 12a to the sipe-like part 12b.

The crown axial groove 7 in each block row are first crown axial grooves 8 and second crown axial grooves 9 which are alternately arranged in the tire circumferential direction.

The first crown axial groove 8 is defined as having a groove width W5 in a range of from 2.0 to 8.0 mm along the entire length thereof.

The second crown axial groove 9 is formed by a main part 9a having a groove width W6 in a range of from 2.0 to 8.0 mm, a very narrow sipe-like part 9b having a substantially constant groove width W7 of from 0.5 to 2.0 mm less than W6 and extending axially inwardly from the main part 9a to open towards the crown main groove 3, and
a transitional part 9c connecting between the main part 9a and the sipe-like part 9b and having a groove width gradually decreasing from the main part 9a to the sipe-like part 9b.

If the groove width W5 of the first crown axial groove 8 is less than 2.0 mm, or the groove width W6 of the main part 9a of the second crown axial groove 9 is less than 2.0 mm, then the in-groove snow shearing force tends to become insufficient. If the groove width W5 is more than 8.0 mm, or the groove width W6 is more than 8.0 mm, then there is a possibility that the rigidity of the annular crown portion 5 becomes insufficient, and uneven wear occurs in this portion 5.

Therefore, the groove width W5 of the first crown axial groove 8 is not less than 2.0 mm, preferably not less than 2.3 mm, more preferably not less than 2.5 mm, but not more than 8.0 mm, preferably not more than 7.0 mm, more preferably not more than 6.5 mm.

The groove width W6 of the main part 9a of the second crown axial groove 9 is not less than 2.0 mm, preferably not less than 2.3 mm, more preferably not less than 2.5 mm, but not more than 8.0 mm, preferably not more than 7.0 mm, more preferably not more than 6.5 mm.

For similar reasons, the groove width W8 of the first shoulder axial groove 11 is preferably not less than 4.0 mm, more preferably not less than 5.0 mm, but preferably not more than 9.0 mm, still more preferably not more than 8.0 mm.

The groove width W9 of the main part 12a of the second shoulder axial groove 12 is preferably not less than 3.8 mm, more preferably not less than 5.0 mm, but preferably not more than 9.0 mm, more preferably not more than 8.0 mm.

The maximum depth of the crown axial groove 7 and the maximum depth of the shoulder axial groove 10 are in a range of from 8.0 to 10.0 mm.

The groove widths W7 and W10 of the sipe-like parts 9b and 12b, respectively, are preferably set in a range of from not more than 2.0 mm, more preferably not more than 1.5 mm, but preferably not less than 1.0 mm in order that the sipe-like parts 9b and 12b can block propagation of air resonance sound of the main grooves 3, 4 to the second axial grooves 9, 12 to thereby reduced the noise emission.

By setting the groove widths W7 and W10 in this way, the ground contacting area is increased as the grooved area is reduced by the sipe-like parts 9b and 12b, and the frictional force on dry roads can be increased. Furthermore, due to the increased rigidity, the steering stability during running on dry roads can be improved.

If both of the groove widths W7 and W10 of the sipe-like parts 9b and 12b is more than 2.0 mm, it becomes difficult to block the propagation of air resonance sound. If the groove widths W7 and W10 become less than 1.0 mm, motion of the blocks 5b, 6b when contacting with the ground becomes very small and the snow self-ejecting performance is deteriorated.

The axial length L3 of the sipe-like part 9b is preferably not less than 10%, more preferably not less than 15%, but preferably not more than 30%, more preferably not more than 25% of the axial width Wc of the annular crown portion 5. The axial length L9 of the sipe-like part 12b is preferably not less than 6%, more preferably not less than 10%, but preferably not more than 24%, more preferably not more than 20% of the axial width Ws of the annular shoulder portion 6. If the axial lengths L3 and L9 of the sipe-like parts 9b and 12b are more than the upper limits, the volume of the axial groove 9, 10 is decreased, and on-the-snow performance tends to deteriorate. If the axial lengths L3 and L9 are less than the respective lower limits, the noise reducing effect tends to decrease.

In this embodiment, as shown in FIG. 2, each of the crown axial grooves 7 (8 and 9) is a bent groove made up of an axially inside part 7a extending from the crown main groove 3 towards the shoulder main groove 4 while inclining at an angle $\alpha 1$ with respect to the tire axial direction toward one circumferential direction; and
an axially outside part 7b extending from a position axially outside the axial center (center line) of the width Wc of the crown block 5b to the shoulder main groove 4 while inclining at an angle $\alpha 2$ with respect to the tire axial direction toward the opposite circumferential direction to the inside part 7a. Therefore, the resistance to sound propagation of the crown axial groove 7 is increased by the bent position between the parts 7a and 7b, and as a result, the noise emission can be reduced.

For that purpose, the angle $\alpha 1$ of the inside part 7a and/or the angle $\alpha 2$ of the outside part 7b are/is preferably not less than 10 degrees, more preferably not less than 12 degrees.

Here, the angle ($\alpha 1$, $\alpha 2$) means the angle between the groove center line G5 and the tire axial direction.

However, if the angle $\alpha 1$ and/or the angle $\alpha 2$ are/is too large, the rigidity of the crown block 5b decreases, and uneven wear is liable to occur. Therefore, the angle $\alpha 1$ and/or the angle $\alpha 2$ are/is preferably not more than 30 degrees, more preferably not more than 25 degrees.

The axial length L2 of the outside part 7b is preferably not less than 5%, more preferably not less than 10%, but not more than 25%, more preferably not more than 20% of the width Wc of the annular crown portion 5.

If the axial length L2 is more than 25%, it is difficult to provide necessary rigidity for the axially inner part of the annular crown portion 5 where the ground pressure is high. If the axial length L2 is less than 5%, on the other hand, the resistance to sound propagation can not be increased.

Preferably, the first crown axial groove 8 (including both of its inside part 7a and outside part 7b) has a groove width gradually increasing towards the axially outside in order to facilitate the self-ejection of snow packed in the groove.

In order that the axially outer opening 7o of the crown axial groove 7 does not couple with the axially inner opening 10i of the shoulder axial groove 10, in other words, the air resonance sound coming from the crown axial groove 7 does not propagate directly into the shoulder axial groove 10, as shown in FIG. 3, the circumferential distances L1 between first intersecting points K1 and second intersecting points K2 are preferably set in a range of from 0.3 to 0.7 times the circumferential pitch length P1 of the shoulder axial grooves 10. The intersecting point K1 is that of the center line G2 of the shoulder main groove 4 and an extension (f) of the center line G5 of the crown axial groove 7.

The intersecting point K2 is that of the center line G2 of the shoulder main groove 4 and an extension g of the center line G6 of the shoulder axial groove 10.

In this embodiment, further, as shown in FIG. 2 and FIG. 3, one narrow crown circumferential groove 13 is disposed between every two circumferentially-adjacent crown axial grooves 7 (8 and 9) so as to axially subdivide the crown block 5b therebetween into two axially inner part and outer part.

The narrow crown circumferential groove 13 is composed of a pair of long parts 13a extending from the adjacent crown axial grooves 7 towards the circumferential center of the crown block 5b, while inclining to opposite directions at a small angle $\theta$ with respect to the tire circumferential direction, and a central part 13b extending between the long parts 13a. Thereby, the groove 13 has a zigzag configuration.

In this embodiment, the two long parts 13a extend parallel with each other to have same circumferential length L6.

The narrow crown circumferential groove 13 extends along the widthwise center line of the annular crown portion 5 so that the widthwise center line intersects each of the groove center lines of the long parts 13a and central part 13b.

The angle $\theta$ is not less than 2.0 degrees, preferably not less than 3 degrees, more preferably not less than 5 degrees, but not more than 10 degrees, preferably not more than 8 degrees, more preferably not more than 6.0 degrees.

Therefore, the rigidity of the crown block 5b whose ground pressure is high is optimized for running on icy roads, and the cornering grip performance can be improved.

If however the circumferential length L5 of the central part 13b is increased, it becomes difficult to improve the cornering grip performance. On the other hand, if the length L5 is too short, there is a possibility that the rigidity of the annular crown portion 5 becomes insufficient.

Therefore, the tire circumferential length L5 of the central part 13b is preferably not more than 12%, more preferably not more than 10%, but preferably not less than 2%, more preferably not less than 4% of the circumferential length L7 of the narrow crown circumferential groove 13.

In order to improve the rigidity of the annular crown portion 5 and on-the-ice performance in a well balanced manner, as shown in FIG. 3, the groove width W3 of the narrow crown circumferential groove 13 is set in a range of from 30 to 40% of the groove width W1 of the crown main groove 3.

The groove depth D3 of the narrow crown circumferential groove 13 is preferably not less than 56%, more preferably not less than 61%, but preferably not more than 76%, more preferably not more than 71% of the groove depth D1 of the crown main groove 3.

Figure 4:
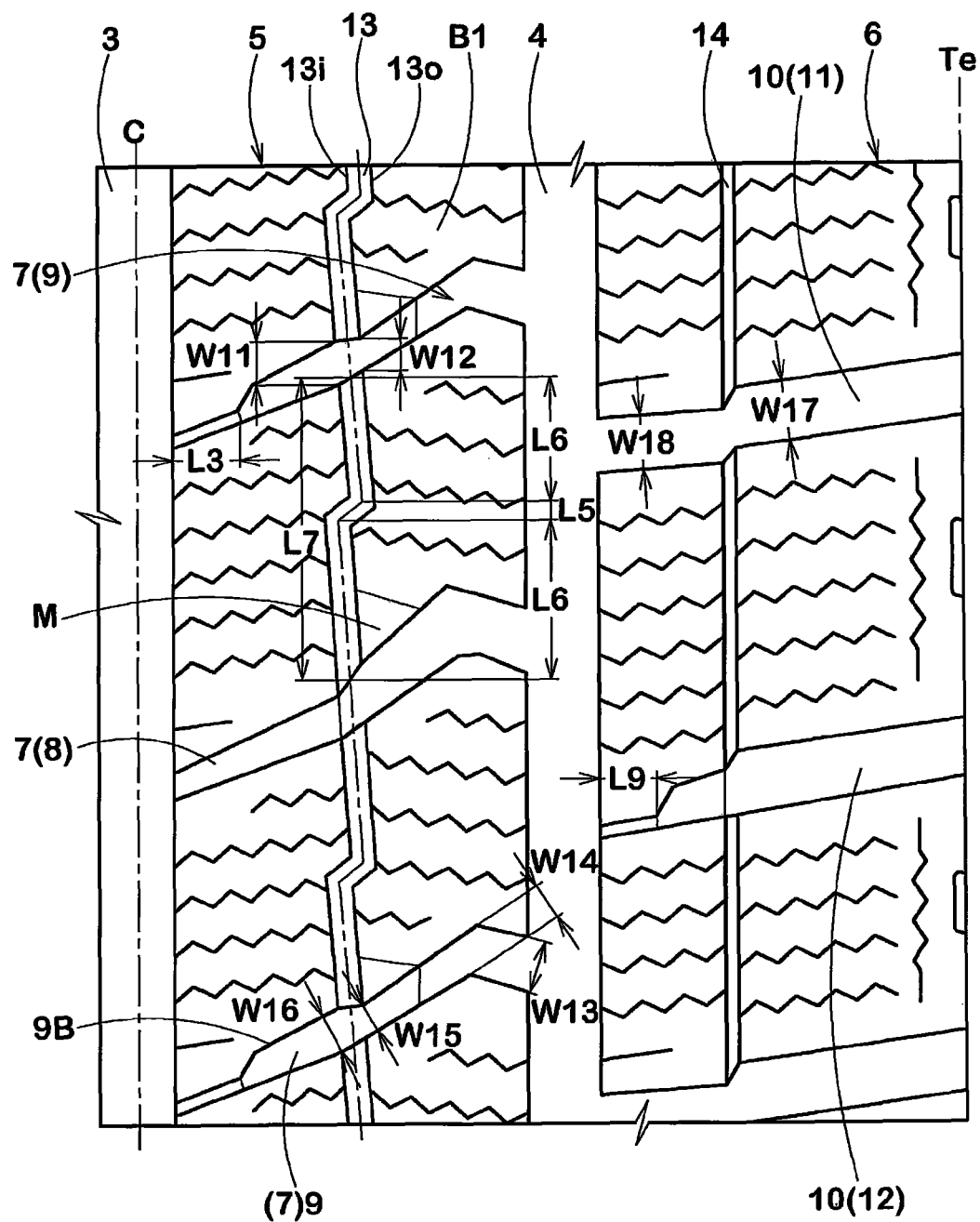
FIG. 4 is a further enlarged developed view of the tread portion.
Figure 5A:
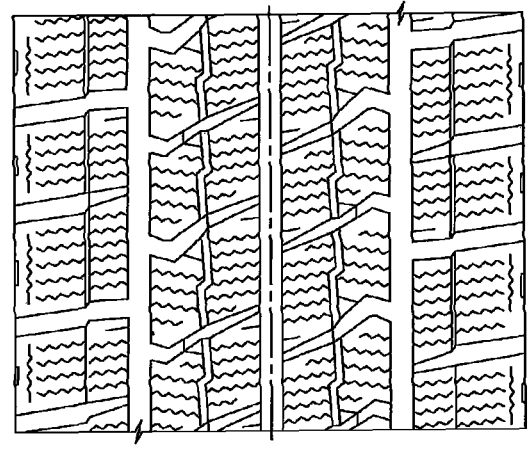
FIGS. 5(A), 5(B) and 5(C) are developed views of tread portions of test tires Ref. 1-Ref. 3.
Figure 5B:
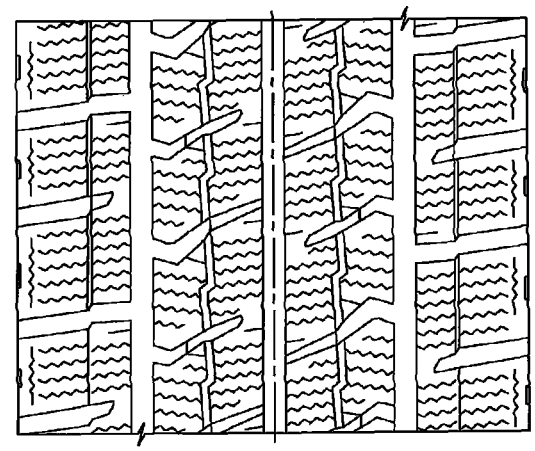
Figure 5C:
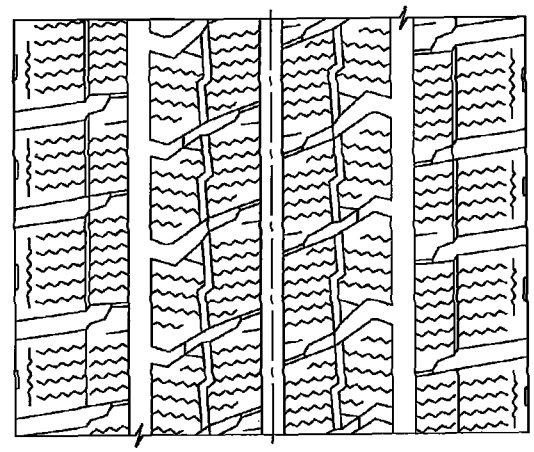

As shown in FIG. 4, the second crown axial groove 9 has a circumferential width W11 at the axially inner edge 13i of the narrow crown circumferential groove 13 and a circumferential width W12 at the axially outer edge 13o of the narrow crown circumferential groove 13, wherein the width W11 is more than the width W12, whereby air pumping noise sound of the second crown axial groove 9 can be distributed and damped by the narrow crown circumferential groove 13 and the noise can be further reduced. Further, the in-groove snow shearing force is increased on the side of width W11, and on-the-snow performance is improved.

Preferably, the groove width W15 of the second crown axial groove 9 at the axially outer edge 13o of the narrow crown circumferential groove 13 is not less than 0.6 times, more preferably not less than 0.7 times, but not more than 1.0 times, more preferably not more than 0.8 times the groove width W16 of the second crown axial groove 9 at the axially inner edge 13i of the narrow crown circumferential groove 13.

Further, in order to improve the noise emission and the rigidity of the annular crown portion 5 in a well balanced manner, as shown in FIG. 4, the groove width W14 of the inside part 7a of the second crown axial groove 9 at the intersection with the outside part 7b is preferably not less than 0.6 times, more preferably not less than 0.7 times, but not more than 1.0 times, more preferably not more than 0.9 times the groove width W13 of the outside part 7b at the opening thereof towards the shoulder main groove 4.

As shown in FIG. 4, in order to improve on-the-ice grip performance, one groove edge 9B of the second crown axial groove 9 is zigzag in a part axially inside the narrow crown circumferential groove 13.

As shown in FIG. 3 and FIG. 4, the axially outer subdivided part of each of the crown blocks 5b is provided with a chamfer M on the acute angled corner B1 in between the narrow crown circumferential groove 13 and crown axial groove 7. The chamfer M has a substantially triangular shape in the plan view. In the plan view, the surface area A1 of the chamfer M is preferably not less than 6%, still more preferably not less than 11%, but not more than 26%, still more preferably not more than 21% of the ground contacting area A2 (excluding the grooved area) of the crown block 5b.

If the surface area is more than 26%, there is a tendency that on-the-ice performance is deteriorated. If less than 6%, it becomes difficult to prevent the block edge B1 from being torn off.

In this embodiment, further, as shown in FIG. 3, one narrow shoulder circumferential groove 14 is disposed between every two circumferentially adjacent shoulder axial grooves 10 to axially subdivide the shoulder block 6b into two axially inner and outer parts.

The narrow shoulder circumferential groove 14 preferably has a groove width W4 less than the groove width W3 of the narrow crown circumferential groove 13 to thereby relatively increase the rigidity of the shoulder block 6b. Thus, good steering stability on dry roads and good steering stability on icy roads can be obtained. For that purpose, the groove width W4 of the narrow shoulder circumferential groove 14 is preferably set in a range of from 10 to 20% of the groove width W1 of the crown main groove 3. The groove depth D4 of the narrow shoulder circumferential groove 14 is preferably not less than 6%, more preferably not less than 11%, but not more than 26%, still more preferably not more than 21% of the groove depth D1 of the crown main groove 3. The narrow shoulder circumferential groove 14 in this example is a straight groove. The axial distance L11 between the groove center line G4 of the narrow shoulder circumferential groove 14 and the tread edge Te is set in a range of from 54 to 74% of the width Ws of the annular shoulder portion 6. Thereby, a rigidity balance between the axially outer part and the axially inner part of the annular shoulder portion 6 is optimized for the steering stability.

In this embodiment, the axially outer part and axially inner part of the first shoulder axial groove 11, which are on the axially outside and inside, respectively, of the intersecting point K3 with the narrow shoulder circumferential groove 14, are circumferentially sifted from each other by a circumferential length L12 of not less than 1.0 mm, preferably not less than 2.0 mm.

Thereby, even in the first shoulder axial groove 11 not provided with the sipe-like part, the air resonance sound can be distributed and damped at the shifted position (intersecting point K3), and the noise emission can be reduced. Further, the cornering grip is increased and on-the-snow performance can be improved.

If however the length L12 is too long, uneven wear is liable to occur on the shoulder block 6b.

Therefore, the length L12 is preferably not more than 5.0 mm, more preferably not more than 3.0 mm.

Further, as shown in FIG. 4, the groove width W18 of the axially inner part of the first shoulder axial groove 11 on the axially inside of the narrow shoulder circumferential groove 14 is not less than 0.7 times but not more than 1.0 times the groove width W17 of the axially outer part of the first shoulder axial groove 11 on the axially outside of the narrow shoulder circumferential groove 14.

Comparison Tests

Test tires, studless tires of size 195/65R15 (rim size 15×6.0J) for passenger cars, were prepared and tested. The test tires had the tread pattern shown in FIG. 2 and specifications shown in Table 1. The common specifications are as follows.
    tread width TW: 166 mm
    crown main groove
        width W1: 7.2 mm
        depth D1: 9.1 mm
    shoulder main groove
        width W2: 7.2 mm
        depth D2: 9.1 mm
        Wg2/TW: 24%
    first crown axial groove
        width W5: varied between 2.5 mm and 6.0 mm
    second crown axial groove
        width W6 of main part: 2.5 to 5.3 mm
        width W13: 5.3 mm
        width W14: 4.0 mm
        width W15: 2.7 mm
        width W16: 4.0 mm
    first and second crown axial grooves
        angle $\alpha 1$ of inside part: 13 to 20 degrees
        angle $\alpha 2$ of outside part: 15 degrees
    first shoulder axial groove
        width W17: 7.2 mm
        width W18: 7.9 mm
    second shoulder axial groove
        width W9 of main part: 3.9 to 5.8 mm
    narrow crown circumferential groove
        width W3: 2.5 mm
        depth D3: 6.0 mm
        angle $\theta$: 4 degrees
    narrow shoulder circumferential groove
        width W4: 1.25 mm
        depth D4: 1.5 mm
        L11/Ws: 64%
        length L12: 1.8 mm The test tires were mounted on a test car (2000 cc passenger car, tire pressure 200 kPa) and subjected to the following comparison tests.

Running Performance Test

The test car was run on a snowy road surface, an icy road surface and a dry asphalt road surface in a tire test course, and running performance was evaluated by the test driver comprehensively based on the steering wheel response, road grip, braking force and traction force on snowy and icy roads, and rigid impression on dry road.

The results are indicated in Table 1 by an index based on comparative example 1 being 100, wherein the larger the value, the better the performance.

Pass-By Noise Test:

According to the "Test Procedure for Tire Noise" specified in Japanese JASO-C606, the test car was coasted for 50 meter distance at a speed of 60 km/h in a straight test course, and the maximum noise sound level in dB(A) was measured with a microphone set at 1.2 meter height from the road surface and 7.5 meter sideways from the running center line in the midpoint of the course.

The results are indicated in Table 1 by an index based on comparative example 1 being 100, wherein the larger the value, the smaller the pass-by noise.

grooves extending across the entire width of the crown land portion, and the crown axial grooves include:

first crown axial grooves each having a groove width of not less than 2.0 mm along its entire length; and second crown axial grooves each comprising a main part having a groove width of not less than 2.0 mm, and a sipe-like part having a groove width of 0.5 to 2.0 mm and formed on the axially inside of the main part continuously from the main part and opened into the crown main groove,

TABLE 1

| Tire | Ref. 1 | Ref. 2 | Ref. 3 | Ref. 4 | Ex. 1 | Ex. 2 | Ref. 5 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|---|---|---|
| Sipe-like part | | | | | | | | | | | | | | | | | | |
| arrangement (FIG. No.) | 5(A) | 5(B) | 5(C) | 2 | 2 | 2 | 2 | 2 | 2 | 2 | 2 | 2 | 2 | 2 | 2 | 2 | 2 | 2 |
| width 9b & 12b (mm) | — | — | 1.2 | 0.4 | 1.2 | 2.0 | 4.0 | 1.2 | 1.2 | 1.2 | 1.2 | 1.2 | 1.2 | 1.2 | 1.2 | 1.2 | 1.2 | 1.2 |
| Crown axial groove | | | | | | | | | | | | | | | | | | |
| angle α1 & α2 (deg.) | 10 | 10 | 10 | 10 | 10 | 10 | 10 | 15 | 20 | 25 | 30 | 20 | 20 | 20 | 20 | 20 | 20 | 20 |
| L2/Wc (%) | 5 | 5 | 5 | 5 | 5 | 5 | 5 | 5 | 5 | 5 | 5 | 10 | 20 | 25 | 15 | 15 | 15 | 15 |
| L1/P1 (%) | 40 | 40 | 40 | 40 | 40 | 40 | 40 | 40 | 40 | 40 | 40 | 40 | 40 | 40 | 40 | 5 | 30 | 45 |
| Running performance | | | | | | | | | | | | | | | | | | |
| snowy road | 100 | 82 | 82 | 82 | 91 | 96 | 98 | 91 | 93 | 93 | 93 | 94 | 95 | 95 | 94 | 98 | 95 | 93 |
| icy road | 100 | 103 | 104 | 104 | 102 | 100 | 97 | 102 | 103 | 103 | 102 | 103 | 102 | 102 | 103 | 103 | 103 | 103 |
| dry road | 100 | 106 | 107 | 106 | 105 | 103 | 100 | 105 | 104 | 103 | 103 | 103 | 101 | 100 | 103 | 103 | 103 | 103 |
| Pass-by Noise | 100 | 112 | 113 | 113 | 111 | 109 | 100 | 112 | 113 | 113 | 114 | 114 | 116 | 117 | 116 | 108 | 114 | 116 |

The invention claimed is:

1. A pneumatic tire comprising a tread portion provided with
a pair of axially outermost shoulder main grooves extending continuously in the tire circumferential direction;
at least one crown main groove extending continuously in the tire circumferential direction and disposed between the axially outermost shoulder main grooves;
a pair of shoulder land portions extending between the axially outermost shoulder main grooves and tread edges; and
a pair of crown land portions extending from the axially outermost shoulder main grooves to the adjacent crown main groove or grooves,
wherein each said shoulder land portion is circumferentially divided into a plurality of shoulder blocks divided by shoulder axial grooves extending across the entire width of the shoulder land portion, and the shoulder axial grooves include:
first shoulder axial grooves each having a groove width of not less than 3.5 mm along its entire length; and
second shoulder axial grooves each comprising a main part having a groove width of not less than 3.5 mm, and a sipe-like part having a groove width of 0.5 to 2.0 mm and formed on the axially inside of the main part continuously from the main part and opened into the axially outermost shoulder main groove,
wherein the first shoulder axial grooves and the second shoulder axial grooves in each said shoulder land portion are arranged alternately one by one in the tire circumferential direction,
wherein each said crown land portion is circumferentially divided into a plurality of crown blocks by crown axial
wherein the first crown axial grooves and the second crown axial grooves are arranged alternately one by one in the tire circumferential direction,
wherein each said crown land portion is provided between every two circumferentially-adjacent crown axial grooves with a narrow crown circumferential groove so as to axially divide the crown block into two,
wherein each of the first and second crown axial grooves is a bent groove made up of:
a part extending from the crown main groove to a bent point while inclining toward one circumferential direction; and
a part extending from the bent point to the shoulder main groove while inclining toward the other circumferential direction,
wherein the bent point is located between the narrow crown circumferential groove and the shoulder main groove, and
wherein said shoulder blocks and said crown blocks are each provided with a plurality of zigzag sipes.

2. The pneumatic tire as set forth in claim 1, wherein a distance in the tire circumferential direction between
a first intersecting point at which the crown axial groove and
the shoulder main groove intersect, and
a second intersecting point at which the shoulder axial groove and the shoulder main groove intersect,
is 0.3 to 0.7 times a circumferential pitch length of the shoulder axial grooves.

3. The pneumatic tire as set forth in claim 2, wherein
the narrow crown circumferential groove is composed of
a pair of end parts respectively extending from the crown axial grooves toward the center of the crown block while inclining with respect to the tire circumferential direction oppositely to each other at angles of 2.0 to 10.0 degrees, and a central part connecting between said pair of the end parts to have a zigzag shape.

4. The pneumatic tire as set forth in claim 1, wherein the narrow crown circumferential groove is composed of a pair of end parts respectively extending from the crown axial grooves toward the center of the crown block while inclining with respect to the tire circumferential direction oppositely to each other at angles of 2.0 to 10.0 degrees, and a central part connecting between said pair of the end parts to have a zigzag shape.

5. The pneumatic tire as set forth in claim 4, wherein the groove width of the second crown axial groove measured at the axially inner edge of the narrow crown circumferential groove is more than the groove width of the second crown axial groove measured at the axially outer edge of the narrow crown circumferential groove.

6. The pneumatic tire as set forth in claim 5, wherein the axially outer part of the crown block divided by said narrow crown circumferential groove has an acute angled corner between the narrow crown circumferential groove and the crown axial groove, and the acute angled corner is provided with a chamfer which has a substantially triangular shape in a plan view of the crown block.

7. The pneumatic tire as set forth in claim 5, wherein each said shoulder land portion is provided between every two circumferentially-adjacent shoulder axial grooves with a narrow shoulder circumferential groove to axially divide the shoulder block into two, and the narrow shoulder circumferential groove has a groove width less than the groove width of the narrow crown circumferential groove.

8. The pneumatic tire as set forth in claim 4, wherein the axially outer part of the crown block divided by said narrow crown circumferential groove has an acute angled corner between the narrow crown circumferential groove and the crown axial groove, and the acute angled corner is provided with a chamfer which has a substantially triangular shape in a plan view of the crown block.

9. The pneumatic tire as set forth in claim 8, wherein each said shoulder land portion is provided between every two circumferentially-adjacent shoulder axial grooves with a narrow shoulder circumferential groove to axially divide the shoulder block into two, and the narrow shoulder circumferential groove has a groove width less than the groove width of the narrow crown circumferential groove.

10. The pneumatic tire as set forth in claim 4, wherein each said shoulder land portion is provided between every two circumferentially-adjacent shoulder axial grooves with a narrow shoulder circumferential groove to axially divide the shoulder block into two, and the narrow shoulder circumferential groove has a groove width less than the groove width of the narrow crown circumferential groove.

11. The pneumatic tire as set forth in to claim 10, wherein an axially inner part and an axially outer part of the first shoulder axial groove, which are on the axially inside and outside, respectively, of an intersecting point of the first shoulder axial groove and the narrow shoulder circumferential groove, are shifted from each other in the tire circumferential direction, and the circumferential shift is in a range of from 1.0 to 2.5 mm.

12. The pneumatic tire as set forth in claim 1, wherein each said first crown axial groove is gradually increased in the groove width from the crown main groove to the narrow crown circumferential groove and gradually increased in the groove width from the narrow crown circumferential groove to the shoulder main groove.

13. The pneumatic tire as set forth in claim 1, wherein each said first crown axial groove is gradually increased in the groove width from the crown main groove to the bent point and gradually increased in the groove width from the bent point to the shoulder main groove.

14. The pneumatic tire as set forth in claim 1, wherein each said second crown axial groove is gradually increased in the groove width from the crown main groove to the narrow crown circumferential groove and gradually increased in the groove width from the narrow crown circumferential groove to the shoulder main groove.

* * * * *